United States Patent
Zhang

(10) Patent No.: US 10,157,000 B2
(45) Date of Patent: Dec. 18, 2018

(54) DATA OPERATION METHOD AND DEVICE

(71) Applicant: Huawei Technologies Co., Ltd., Shenzhen (CN)

(72) Inventor: Ziqi Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 15/145,843

(22) Filed: May 4, 2016

(65) Prior Publication Data

US 2016/0246516 A1 Aug. 25, 2016

Related U.S. Application Data

(63) Continuation of application No. PCT/CN2014/082969, filed on Jul. 25, 2014.

(30) Foreign Application Priority Data

Nov. 7, 2013 (CN) .......................... 2013 1 0552304

(51) Int. Cl.
*G06F 3/06* (2006.01)
*G06F 11/14* (2006.01)
(Continued)

(52) U.S. Cl.
CPC ............ *G06F 3/0613* (2013.01); *G06F 3/061* (2013.01); *G06F 3/0607* (2013.01); *G06F 3/067* (2013.01);
(Continued)

(58) Field of Classification Search
CPC ...... G06F 21/78; G06F 21/575; G06F 21/554; G06F 21/57; G06F 21/64; G06F 21/71;
(Continued)

(56) References Cited

U.S. PATENT DOCUMENTS 7,065,618 B1 * 6/2006 Ghemawat ........ G06F 17/30215
707/999.201
7,961,959 B2 6/2011 Bashyam et al.
(Continued)

FOREIGN PATENT DOCUMENTS

CN 1971498 A 5/2007
CN 101019105 A 8/2007
(Continued)

OTHER PUBLICATIONS

Foreign Communication From A Counterpart Application, European Application No. 14859802.2, Extended European Search Report dated Aug. 31, 2016, 7 pages.
(Continued)

*Primary Examiner* — Angelica Ruiz
(74) *Attorney, Agent, or Firm* — Conley Rose, P.C.

(57) ABSTRACT

A data operation method and device, relate to the storage field is presented. The data operation method and device can implement, during modification of a data strip in a storage device, data sending and receiving performed only for a storage device that requires modification. Other irrelevant storage devices do not consume a disk throughput and traffic, thereby reducing a disk throughput and usage of a network resource, that is, reducing a write penalty. A client sends both new and old version numbers to a storage device corresponding to a data strip that does not need to be modified, so that the corresponding storage device compares a version number of the data strip stored by the storage device with the old version number sent by the client. When the two version numbers are consistent, the version number in the storage device is updated to the received new version number.

14 Claims, 5 Drawing Sheets

(51) Int. Cl.
*G06F 17/30* (2006.01)
*G06F 11/00* (2006.01)

(52) U.S. Cl.
CPC .......... *G06F 3/0619* (2013.01); *G06F 3/0634* (2013.01); *G06F 3/0644* (2013.01); *G06F 3/0659* (2013.01); *G06F 3/0689* (2013.01); *G06F 11/00* (2013.01); *G06F 17/30309* (2013.01); *G06F 17/30356* (2013.01); *G06F 11/14* (2013.01)

(58) Field of Classification Search
CPC .... G06F 21/73; G06F 17/30206; G06F 3/067; G06F 8/65; G06F 21/10; G06F 9/466; G06F 8/71; G06F 11/1076
See application file for complete search history.

(56) References Cited

U.S. PATENT DOCUMENTS

| | | | |
|---|---|---|---|
| 2002/0152104 A1* | 10/2002 | Ojha | G06Q 10/06 705/7.25 |
| 2005/0091450 A1 | 4/2005 | Frolund et al. | |
| 2005/0120078 A1 | 6/2005 | Kazar et al. | |
| 2007/0115731 A1 | 5/2007 | Hung | |
| 2008/0301311 A1 | 12/2008 | Bestler | |
| 2009/0178144 A1* | 7/2009 | Redlich | G06F 21/6209 726/27 |
| 2010/0037023 A1 | 2/2010 | Aszmann et al. | |
| 2010/0281214 A1 | 11/2010 | Jernigan | |
| 2013/0198585 A1 | 8/2013 | Braam et al. | |

FOREIGN PATENT DOCUMENTS

| | | |
|---|---|---|
| CN | 102177496 A | 9/2011 |
| CN | 102460439 A | 5/2012 |
| CN | 102722340 A | 10/2012 |
| CN | 103558998 A | 2/2014 |

OTHER PUBLICATIONS

Partial English Translation and Abstract of Chinese Patent Application No. CN103558998, Apr. 29, 2016, 3 pages.
Partial English Translation and Abstract of Chinese Patent Application No. CN102722340, Aug. 3, 2016, 19 pages.
Foreign Communication From A Counterpart Application, Chinese Application No. 201310552304.4, Chinese Office Action dated Nov. 4, 2015, 5 pages.
Foreign Communication From A Counterpart Application, PCT Application No. PCT/CN2014/082969, English Translation of International Search Report dated Oct. 27, 2014, 2 pages.
Foreign Communication From A Counterpart Application, PCT Application No. PCT/CN2014/082969, English Translation of Written Opinion dated Oct. 27, 2014, 7 pages.

* cited by examiner

|      | 1 | 2 | 3 | 4 | 5 | 6 | P | Q |
|------|---|---|---|---|---|---|---|---|
| 128K |   |   |   |   |   |   |   |   |

|      | 1 | 2 | 3 | 4 | 5 | 6 | P | Q |
|------|---|---|---|---|---|---|---|---|
| 128K |   | ▨ |   |   |   |   | ▨ | ▨ |

DATA OPERATION METHOD AND DEVICE

CROSS-REFERENCE TO RELATED APPLICATIONS

This application is a continuation of International Application No. PCT/CN2014/082969, filed on Jul. 25, 2014, which claims priority to Chinese Patent Application No. 201310552304.4, filed on Nov. 7, 2013, both of which are hereby incorporated by reference in their entireties.

TECHNICAL FIELD

The present disclosure relates to the storage field, and in particular, to a data operation method and device.

BACKGROUND

An object-based storage system combines advantages of a network-attached storage (NAS) and a storage area network (SAN); therefore, the object-based storage system begins to serve as a main storage structure in a data storage system currently. An object is a basic unit in the object-based storage system, includes file data and relevant attribute information, and is easy to manage. An object-based storage device (OSD) is a basic constituent unit of a distributed object-based storage system, and is responsible for storage of an object. In order to ensure reliability of a stored object, for a same object, methods of multiple duplicates and an erasure code are used for protection. That is, as shown in FIG. 1, one object is stored in different OSDs, each OSD stores a part of data of the object, and parity data obtained according to an erasure code is also stored in several OSDs. In this way, even if a fault occurs in some of the OSDs, the object can be restored from the remaining OSDs according to a restoration algorithm.

However, if data in some of the OSDs in FIG. 1 needs to be modified, typically, data needs to be rewritten into all OSDs in an object-based storage system, which increases network traffic and a disk input/output (IO) throughput in the object-based storage system, causing a waste of system resources, where the waste of system resources herein is also referred to as a write penalty.

SUMMARY

Embodiments of the present disclosure provide a data operation method and device, which enable, during modification of a data strip in a storage device, data sending and receiving to be performed only for a storage device that requires modification; other irrelevant storage devices do not consume a disk throughput and traffic, thereby reducing a disk throughput and usage of a network resource.

To achieve the foregoing objective, the embodiments of the present disclosure provide the following technical solutions:

According to a first aspect, a data operation method is provided, where the method includes: sending, by a client, a first message to a storage device corresponding to a data strip that does not need to be modified, where the first message carries a new version number and an old version number of the data strip that does not need to be modified; receiving, by the storage device, the first message, and comparing the old version number in the first message with the version number of a data strip in the storage device; and when the old version number in the first message is consistent with the version number of the data strip in the storage device, updating, by the storage device, the version number of the data strip in the storage device according to the new version number in the first message; or when the old version number in the first message is inconsistent with the version number of the data strip in the storage device, sending, by the storage device to the client, a second message indicating a version number mismatch; after receiving the second message, sending, by the client to the storage device that sends the second message, a data strip corresponding to the storage device, and sending a version number of the data strip corresponding to the storage device; and storing, by the storage device, the received data strip, and performing a version number update with respect to the received data strip.

In a first possible implementation manner, with reference to the first aspect, the method further includes: sending, by the client for a data strip that needs to be modified, a third message to a storage device corresponding to the data strip that needs to be modified, where the third message includes the data strip that needs to be modified and a new version number corresponding to the data strip.

In a second possible implementation manner, with reference to the first possible implementation manner of the first aspect, the method further includes: after receiving the third message, performing, by the storage device according to content of the third message, an overwrite operation on the data strip that needs to be modified.

According to a second aspect, a data operation device is provided, where the device includes: a sending unit, sending, by a client, a first message to a storage device corresponding to a data strip that does not need to be modified, where the first message carries a new version number and an old version number of the data strip that does not need to be modified; and a processing unit, receiving, by the storage device, the first message, and comparing the old version number in the first message with the version number of a data strip in the storage device; and when the old version number in the first message is consistent with the version number of the data strip in the storage device, updating, by the storage device, the version number of the data strip in the storage device according to the new version number in the first message; or when the old version number in the first message is inconsistent with the version number of the data strip in the storage device, sending, by the storage device to the client, a second message indicating a version number mismatch; where the sending unit is further configured to: after the client receives the second message, send, to the storage device that sends the second message, a data strip corresponding to the storage device and send a version number of the data strip corresponding to the storage device; and the processor unit is further configured to store, by the storage device, the received data strip, and perform a version number update with respect to the received data strip.

In a first possible implementation manner, with reference to the second aspect, the sending unit is further configured to: send, by the client, a third message to a storage device corresponding to a data strip that needs to be modified, where the third message includes the data strip that needs to be modified and a new version number corresponding to the data strip that needs to be modified.

In a second possible implementation manner, with reference to the first possible implementation manner of the second aspect, the processing unit is further configured to: after the storage device receives the third message, perform, according to content of the third message, an overwrite operation on the data strip that needs to be modified.

According to the data operation method and device provided in the embodiments of the present disclosure, a client sends both new and old version numbers to a storage device corresponding to a data strip that does not need to be modified, so that the corresponding storage device compares a version number of the data strip stored by the storage device with the old version number sent by the client; when the two version numbers are consistent, the version number in the storage device is updated to the received new version number. Therefore, during modification of a data strip in a storage device, data sending and receiving can be performed only for a storage device that requires modification; other irrelevant storage devices do not consume a disk throughput and traffic, thereby reducing a disk throughput and usage of a network resource, that is, reducing a write penalty.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
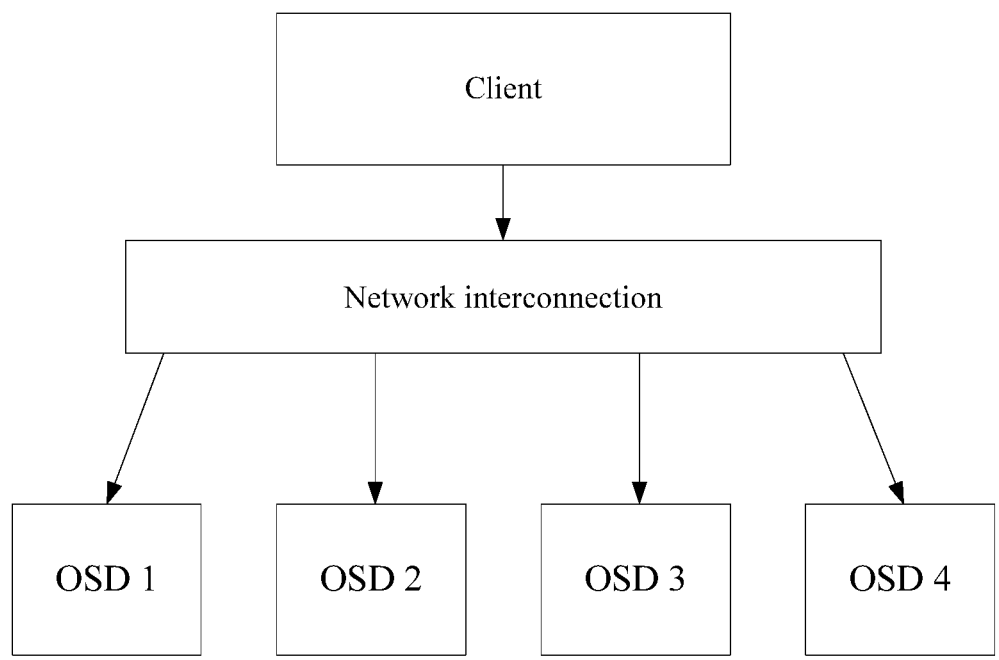
FIG. 1 is a schematic diagram of a structure of a storage device.

In an application scenario shown in FIG. 1, a used storage device is an OSD. A client is interconnected with the OSD over a network, and continuously sends several data strips obtained after segmenting a data stripe that includes to-be-sent data, to three different object-based storage devices OSDs, namely, an OSD 1 to an OSD 3; an OSD 4 stores parity data generated according to an erasure code algorithm. In this way, when a fault occurs on one of the OSDs, data restoration may be performed according to information stored in the other three OSDs, which does not affect normal data read and write operations. Therefore, data reliability is improved.

For a continuous storage structure, shown in FIG. 1, in which the data stripe is divided into four segments, there is data that is stored in the OSD 1 to the OSD 3 by segment. If modification is performed only on data in the OSD 2, and data in the OSD 1 and the OSD 3 remains unchanged, OSDs that require data transmission and writing are the OSD 1 to the OSD 4. The OSD 2 needs to store modified data, and the OSD 4 needs to store parity data that is obtained by means of recalculation, where the OSD 2 and the OSD 4 require data transmission and writing. In a rule in the prior art, although no modification is performed on the OSD 1 or the OSD 3, the OSD 1 and the OSD 3 also need data to be transmitted and written. In this case, twice a disk IO throughput and network traffic are wasted (in the case of a larger data stripe, a problem of waste is more serious).

Figure 2:
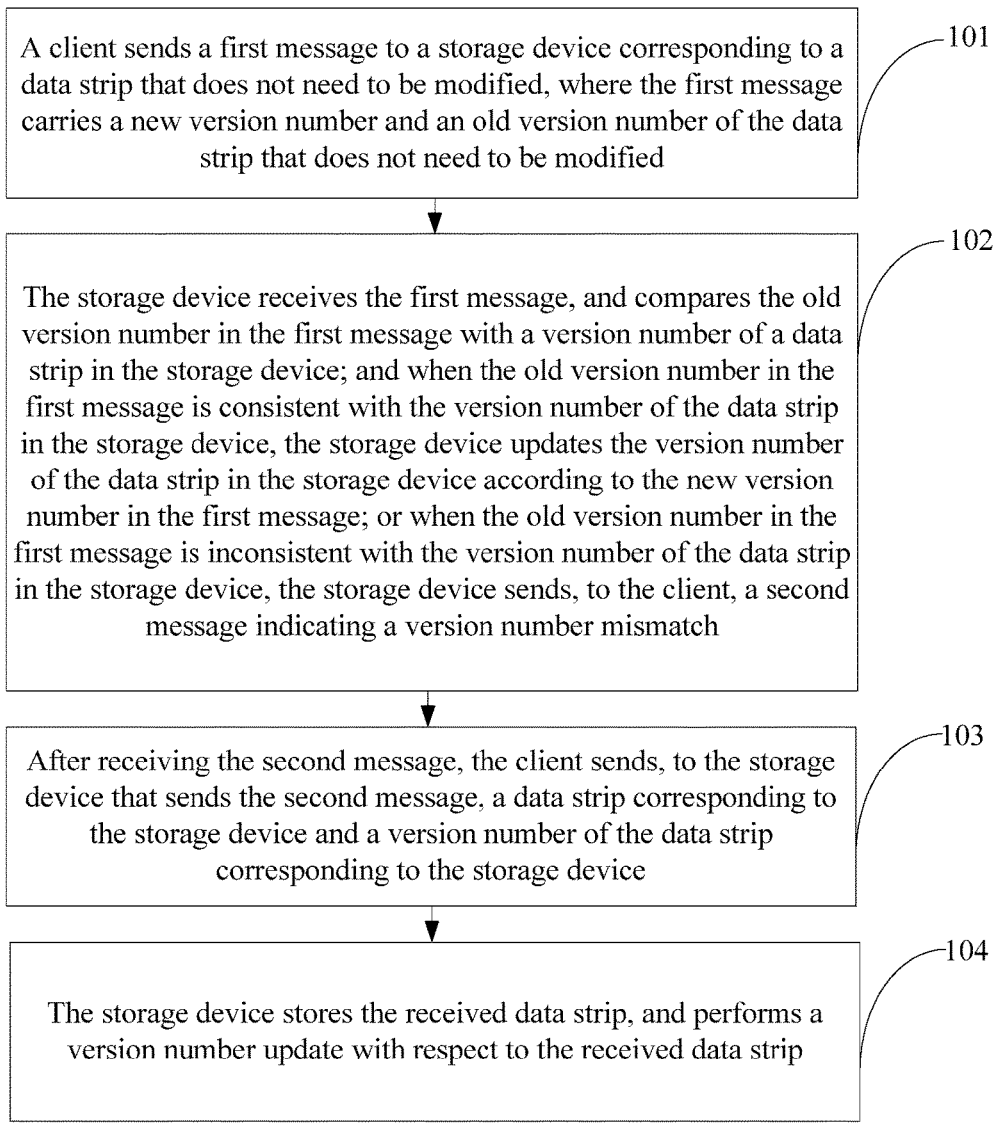
FIG. 2 is a schematic diagram of a data operation method according to an embodiment of the present disclosure.

An embodiment of the present disclosure provides a data operation method. As shown in FIG. 2, the method includes the following steps Step 101: A client sends a first message to a storage device corresponding to a data strip that does not need to be modified, where the first message carries a new version number and an old version number of the data strip that does not need to be modified.

Herein, the data strip that does not need to be modified refers to a data strip that is stored in an OSD and is not modified, and content of the stored data strip is not changed. In addition, the new and old version numbers of the data strip may be represented in multiple forms, for example, a timestamp and a sequence number.

Step 102: The storage device receives the first message, and compares the old version number in the first message with the version number of a data strip in the storage device; and when the old version number in the first message is consistent with the version number of the data strip in the storage device, the storage device updates the version number of the data strip in the storage device according to the new version number in the first message; or when the old version number in the first message is inconsistent with the version number of the data strip in the storage device, the storage device sends, to the client, a second message indicating a version number mismatch.

Step 103: After receiving the second message, the client sends, to the storage device that sends the second message, a data strip corresponding to the storage device and sends a version number of the data strip corresponding to the storage device.

Step 104: The storage device stores the received data strip, and performs a version number update with respect to the received data strip.

According to the data operation method provided in this embodiment of the present disclosure, a client sends both new and old version numbers to a storage device corresponding to a data strip that does not need to be modified, so that the corresponding storage device compares a version number of the data strip stored by the storage device with the old version number sent by the client; when the two version numbers are consistent, the version number in the storage device is updated to the received new version number. Therefore, during modification of a data strip in a storage device, data sending and receiving can be performed only for a storage device that requires modification; other irrelevant storage devices do not consume a disk throughput and traffic, thereby reducing a disk throughput and usage of a network resource, that is, reducing a write penalty.

To describe the method provided by the present disclosure in more detail, an embodiment of the present disclosure further provides a more detailed data operation method.

Step 201: A client sends a first message to a storage device corresponding to a data strip that does not need to be modified, where the first message carries a new version number and an old version number of the data strip that does not need to be modified.

Herein, the data strip that does not need to be modified refers to a data strip that is stored in an OSD and is not modified, and content of the stored data strip is not changed. In addition, the new and old version numbers of the data strip may be represented in multiple forms, for example, a timestamp and a sequence number.

Step 202: The storage device receives the first message, and compares the old version number in the first message with the version number of a data strip in the storage device; and when the old version number in the first message is consistent with the version number of the data strip in the storage device, the storage device updates the version number of the data strip in the storage device according to the new version number in the first message; or when the old version number in the first message is inconsistent with the version number of the data strip in the storage device, the storage device sends, to the client, a second message indicating a version number mismatch.

Step 203: After receiving the second message, the client sends, to the storage device that sends the second message, a data strip corresponding to the storage device and sends a version number of the data strip corresponding to the storage device.

Step 204: The storage device stores the received data strip, and performs a version number update with respect to the received data strip.

Figure 3:
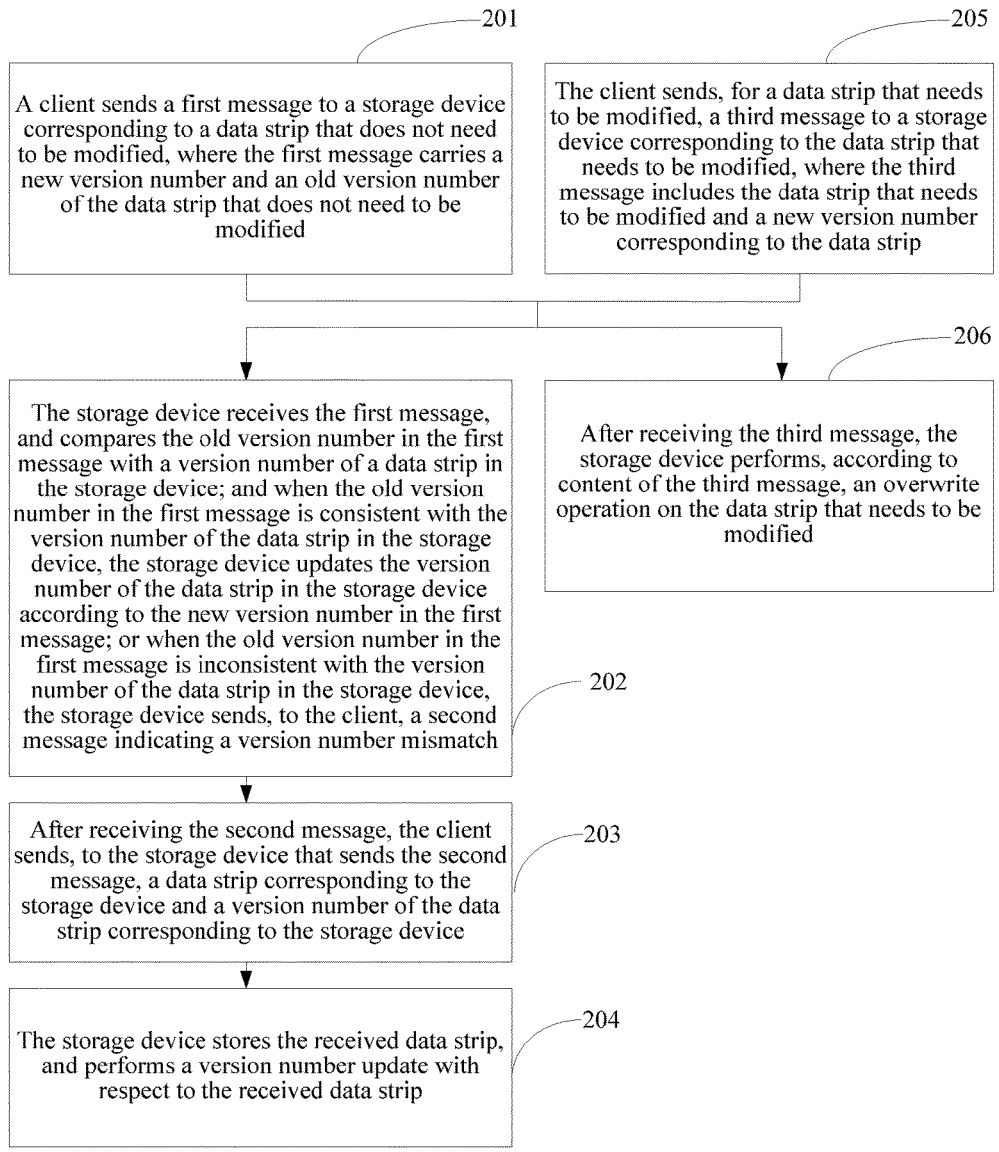
FIG. 3 is a detailed schematic diagram of a data operation method according to an embodiment of the present disclosure.

Further, as shown in FIG. 3, the foregoing method further includes:

Step 205: The client sends, for a data strip that needs to be modified, a third message to a storage device corresponding to the data strip that needs to be modified, where the third message includes the data strip that needs to be modified and a new version number corresponding to the data strip.

Step 206: After receiving the third message, the storage device performs, according to content of the third message, an overwrite operation on the data strip that needs to be modified.

Figures 4, 5, 6:
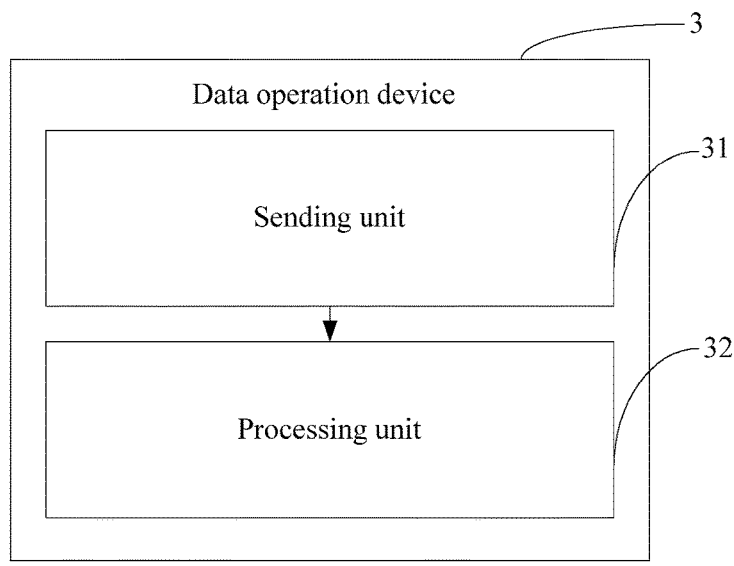
FIG. 4 is a schematic diagram of a data storage structure according to an embodiment of the present disclosure.
FIG. 5 is a schematic diagram of a modified data storage structure according to an embodiment of the present disclosure.
FIG. 6 is a schematic diagram of a structure of a data operation device according to an embodiment of the present disclosure.

In FIG. 4, 1 to Q indicate eight data strips (Strip) that are separately stored in eight OSDs, where 1 to 6 indicate that one object is divided into six segments, and data of the six segments is separately stored in an OSD 1 to an OSD 6 at a time according to a sequence, and parity data that is obtained according to an erasure code is stored in the subsequent OSD P and OSD Q. Herein, a used object-based storage device is designed in a 6+2 manner, that is, six OSDs are used to store object data, and two additional OSDs are used to store parity information. In this way, after a fault occurs on at most two OSDs, normal data read and write operations can be performed according to a restoration algorithm.

Assuming that the OSD 2 requires modification, according to the method in steps 201 to 205:

First, the client sends a first message to the OSD 1 and the OSD 3 to the OSD 6 that do not require modification, where the first message includes new version numbers and old version numbers corresponding to data strips that are stored in the foregoing OSD 1 and the OSD 3 to the OSD 6; and the client sends a third message to the OSD 2 corresponding to a data strip that need to be modified, the OSD P, and the OSD Q, where the third message includes the data strip that needs to be modified and a new version number corresponding the data strip. Herein, it should be noted that parity data is stored in the OSD P and the OSD Q; therefore, as long as an operation such as data modification is performed on a data stripe, content stored in both the OSD P and the OSD Q needs to be retransmitted and rewritten.

Second, after the OSD 1 and the OSD 3 to the OSD 6 receive the first message sent by the client, version number comparison is performed on each OSD; and when a version number of a data strip stored in each OSD is consistent with the old version number in the first message, each of the foregoing OSDs updates an original old version number according to the new version number in the first message; or when a version number of a data strip stored in one of the OSDs is inconsistent with the old version number in the received first message, the corresponding OSD returns a second message to the client, where the second message is used to feed back a problem that the version numbers of the data strip are inconsistent. For the OSD 2 that requires data modification, the OSD P, and the OSD Q, after the third message is received, the originally stored data strip is replaced with the new data strip in the third message, and the version number in the third message is used as a version number of a data strip in the OSD.

Then, after receiving the second message, the client sends to the storage device that sends the second message, a data strip corresponding to the storage device and sends a version number of the data strip corresponding to the storage device.

Finally, the OSD receiving the data strip stores the data strip, and updates the version number in the OSD according to the version number of the data strip in the second message.

In this way, corresponding to FIG. 4, a schematic diagram of the OSD 2, the OSD P, and the OSD Q after modification is shown in FIG. 5. A shaded part represents data that has been modified, and other parts represent data that has not been modified; leftmost 128 k represents that a data size in each OSD is 128 k.

It can be seen from comparison between FIG. 4 and FIG. 5 that, after the modification, data in the OSD 2 and the OSD Q becomes different. In this case, in a total of the eight OSDs, after one modification, data only in three OSDs needs to be updated using disk IO and network traffic. Compared with another case in which data needs to be updated for all the eight OSDs, 128 k*5=640 k of disk IO and network traffic is reduced, that is, ⅝ of disk IO and network traffic is reduced, which achieves a significant effect.

According to the data operation method provided in this embodiment of the present disclosure, a client sends both new and old version numbers to a storage device corresponding to a data strip that does not need to be modified, so that the corresponding storage device compares a version number of the data strip stored by the storage device with the old version number sent by the client; when the two version numbers are consistent, the version number in the storage device is updated to the received new version number. Therefore, during modification of a data strip in a storage device, data sending and receiving can be performed only for a storage device that requires modification; other irrelevant storage devices do not consume a disk throughput and traffic, thereby reducing a disk throughput and usage of a network resource, that is, reducing a write penalty.

An embodiment of the present disclosure further provides a data operation device 3. As shown in FIG. 6, the device 3 includes: a sending unit 31, sending, by a client, a first message to a storage device corresponding to a data strip that does not need to be modified, where the first message carries a new version number and an old version number of the data strip that does not need to be modified; and a processing unit 32, receiving, by the storage device, the first message, and comparing the old version number in the first message with the version number of a data strip in the storage device; and when the old version number in the first message is consistent with the version number of the data strip in the storage device, updating, by the storage device, the version number of the data strip in the storage device according to the new version number in the first message; or when the old version number in the first message is inconsistent with the version number of the data strip in the storage device, sending, by the storage device to the client, a second message indicating a version number mismatch; where the sending unit 31 is further configured to: after the client receives the second message, send, to the storage device that sends the second message, a data strip corresponding to the storage device and send a version number of the data strip corresponding to the storage device; and the processor unit 32 is further configured to store, by the storage device, the received data strip, and performs a version number update with respect to the received data strip.

According to the data operation device provided in this embodiment of the present disclosure, a client sends both new and old version numbers to a storage device corresponding to a data strip that does not need to be modified, so that the corresponding storage device compares a version number of the data strip stored by the storage device with the old version number sent by the client; when the two version numbers are consistent, the version number in the storage device is updated to the received new version number. Therefore, during modification of a data strip in a storage device, data sending and receiving can be performed only for a storage device that requires modification; other irrelevant storage devices do not consume a disk throughput and traffic, thereby reducing a disk throughput and usage of a network resource, that is, reducing a write penalty.

Figure 7:
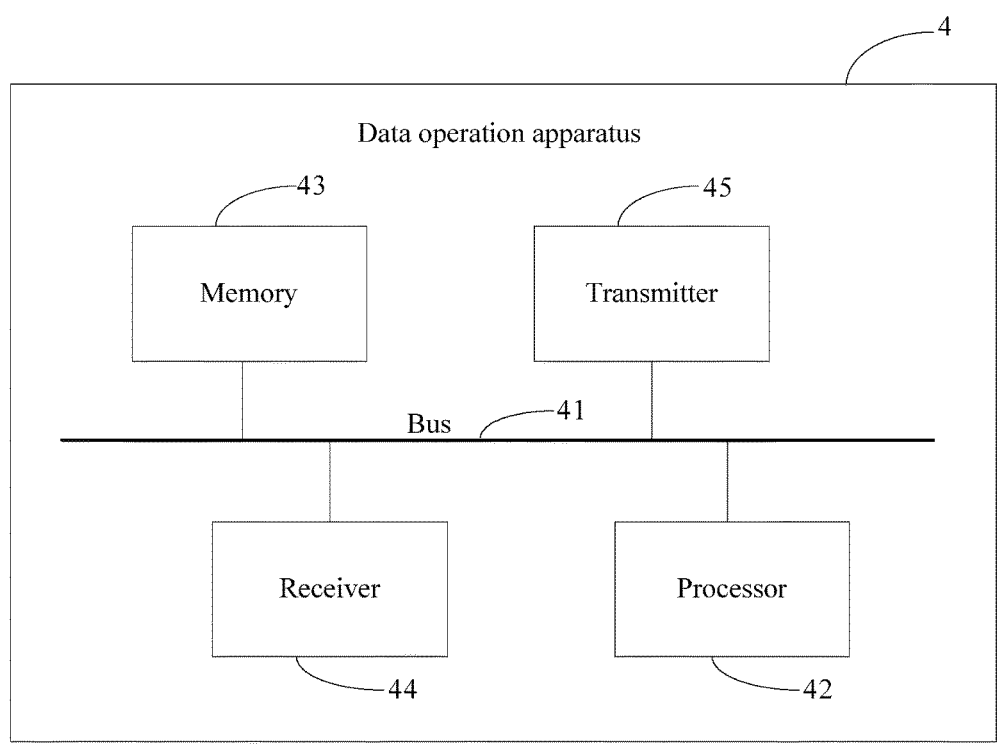
FIG. 7 is a schematic diagram of a structure of a data operation apparatus according to an embodiment of the present disclosure.

An embodiment of the present disclosure further provides a data operation apparatus. As shown in FIG. 7, the apparatus 4 includes: a bus 41, and a processor 42, a memory 43, a receiver 44, and a transmitter 45 that are connected to the bus 41. The memory is configured to store a relevant instruction. The processor 42 executes the relevant instruction and is configured for a client to send a first message to a storage device corresponding to a data strip that does not need to be modified, where the first message carries a new version number and an old version number of the data strip that does not need to be modified. The processor 42 executes the relevant instruction and is configured for the storage device to receive the first message and compare the old version number in the first message with a version number of a data strip in the storage device; and when the old version number in the first message is consistent with the version number of the data strip in the storage device, the storage device updates the version number of the data strip in the storage device according to the new version number in the first message; or when the old version number in the first message is inconsistent with the version number of the data strip in the storage device, the storage device sends, to the client, a second message indicating a version number mismatch. The processor 42 executes the relevant instruction and is configured for the client to send, after receiving the second message and to the storage device that sends the second message, a data strip corresponding to the storage device and send a version number of the data strip corresponding to the storage device. The processor 42 executes the relevant instruction and is configured for the storage device to store the received data strip and perform a version number update with respect to the received data strip.

In this embodiment of the present disclosure, optionally, the processor 42 is further configured for the client to send, for a data strip that needs to be modified, a third message to a storage device corresponding to the data strip that needs to be modified, where the third message includes the data strip that needs to be modified and a new version number corresponding to the data strip.

In this embodiment of the present disclosure, optionally, the processor 42 is further configured for the storage device to perform, after receiving the third message and according to content of the third message, an overwrite operation on the data strip that needs to be modified.

Therefore, according to the data operation apparatus provided in this embodiment of the present disclosure, a client sends both new and old version numbers to a storage device corresponding to a data strip that does not need to be modified, so that the corresponding storage device compares a version number of the data strip stored by the storage device with the old version number sent by the client; when the two version numbers are consistent, the version number in the storage device is updated to the received new version number. Therefore, during modification of a data strip in a storage device, data sending and receiving can be performed only for a storage device that requires modification; other irrelevant storage devices do not consume a disk throughput and traffic, thereby reducing a disk throughput and usage of a network resource, that is, reducing a write penalty.

In the several embodiments provided in the present application, it should be understood that the disclosed method, device, and apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data operation method comprising:
    sending, by a client, a first message to a storage device corresponding to an unmodified data strip, the storage device being one of a plurality of storage devices that each stores one data strip of a data stripe and the first message comprising a new version number and an old version number of the data strip that does not need to be modified;
    receiving, by the storage device, the first message;
    comparing the old version number with a version number stored in the storage device for the unmodified data strip;
    updating, by the storage device, the version number stored in the storage device for the unmodified data strip to the new version number when the old version number is consistent with the version number stored in the storage device for the unmodified data strip in the storage device;
    sending, by the storage device to the client, a second message indicating a version number mismatch when the old version number is inconsistent with the version number stored in the storage device for the unmodified data strip;
    sending, by the client to the storage device, the unmodified data strip and the new version number to the storage device in response to receiving the second message;
    storing, by the storage device, the unmodified data strip and the new version number and to perform a version number update with respect to the unmodified data strip.

2. The method according to claim 1, further comprising sending, by the client for a modified data strip, a third message to a storage device corresponding to the modified data strip, the third message comprising the modified data strip and a new version number corresponding to the modified data strip.

3. The method according to claim 2, further comprising performing, by the storage device, an overwrite operation on the modified data strip in response to receiving the third message.

4. A data operation system comprising:
    a plurality of storage devices, each storage device storing one data strip of a data stripe,
    a data operation device coupled to the storage devices and being configured to send a first message to a selected one of the storage devices that corresponds to an unmodified data strip, the first message comprising a new version number and an old version number of the unmodified data strip;
    the selected storage device being configured to:
        receive the first message;
        compare the old version number with a version number stored in the storage device for the unmodified data strip;
        update the version number stored in the storage device for the unmodified data strip to the new version number when the old version number is consistent with the version number stored in the storage device for the unmodified data strip; and
        send a second message indicating a version number mismatch to the data operation device when the old version number is inconsistent with the version number stored in the storage device for the unmodified data strip;
    the data operation device being further configured to send the unmodified data strip and the new version number to the storage device in response to receiving the second message; and
    the storage device being further configured to store the unmodified data strip and the new version number and to perform a version number update with respect to the unmodified data strip.

5. The data operation system according to claim 4, wherein the data operation device is further configured to send, for a modified data strip, a third message to a storage device corresponding to the modified data strip, the third message comprising the modified data strip and a new version number corresponding to the modified data strip.

6. The data operation system according to claim 5, wherein the storage device is further configured to perform an overwrite operation on the modified data strip that needs in response to receiving the third message.

7. A data operation apparatus, comprising:
    a memory storing instructions; and
    a processor coupled to the memory and configured to execute the instructions to:
        send a first message to a first storage device, the first message relating to an unmodified data strip stored in the first storage device and comprising a new version number and an old version number of the unmodified data strip;
        receive a second message from the first storage device in response to the first message, the second message indicating the old version number is inconsistent with a version number stored in the first storage device for the unmodified data strip; and
        send the unmodified data strip and the new version number of the unmodified data strip to the first storage device in response to the second message.

8. The data operation apparatus of claim 7, wherein the processor is configured to execute the instructions to send a third message to a second storage device, the third message comprising a modified data strip and a new version number corresponding to the modified data strip.

9. The data operation apparatus of claim 7, wherein the new version number and the old version number comprise one or both of a timestamp or a sequence number.

10. The data operation apparatus of claim 7, wherein:
    the unmodified data strip is one of a plurality of data strips;
    the first storage device is one of a plurality of storage devices, each of the plurality of data strips stored in an associated one of the plurality of storage devices;
    the first message is one of one or more first messages, each of the one or more first messages comprising a new version number and an old version number of an associated unmodified data strip; and
    the processor is configured to execute the instructions to:

send each of the one or more first messages to the first storage device in which the unmodified data strip associated with the first message is stored;

receive one or more second messages from an associated one or more of the first storage devices that were sent first messages; and send associated unmodified data strips and new version numbers only to the one or more first storage devices in response to the one or more second messages.

11. The data operation apparatus of claim 10, wherein the plurality of data strips comprises a modified data strip and the processor is configured to execute the instructions to send a third message comprising the modified data strip and a new version number corresponding to the modified data strip to a second storage device of the plurality of storage devices, the second storage device storing the modified data strip.

12. A data operation apparatus, comprising:

a memory storing instructions; and a processor coupled to the memory and configured to execute the instructions to:

receive a first message, the first message relating to an unmodified data strip stored in the data operation apparatus, the first message comprising a new version number and an old version number of the unmodified data strip;

compare the old version number in the first message with a version number stored in the storage device for the unmodified data strip;

update the version number stored in the storage device for the unmodified data strip to the new version number when the old version number is consistent with the version number stored in the storage device for the unmodified data strip;

send a second message when the old version number is not consistent with the version number stored in the storage device for the unmodified data strip;

receive the unmodified data strip and the new version number of the unmodified data strip; and store the unmodified data strip and the new version number of the unmodified data strip.

13. The data operation apparatus of claim 12, wherein the processor is configured to execute the instructions to:

receive a third message comprising a modified data strip and a new version number corresponding to the modified data strip; and overwrite a previous version of the modified data strip and a previous version number corresponding to the modified data strip with the received modified data strip and the received new version number.

14. The data operation apparatus of claim 12, wherein the new version number and the old version number comprise one or both of a timestamp or a sequence number.

* * * * *